United States Patent
Zhang

(10) Patent No.: US 9,666,159 B2
(45) Date of Patent: May 30, 2017

(54) DISPLAY, DISPLAY SYSTEM AND DATA PROCESSING METHOD

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventor: Dayu Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 108 days.

(21) Appl. No.: 14/437,075

(22) PCT Filed: Aug. 27, 2014

(86) PCT No.: PCT/CN2014/085289
§ 371 (c)(1),
(2) Date: Apr. 20, 2015

(87) PCT Pub. No.: WO2015/161599
PCT Pub. Date: Oct. 29, 2015

(65) Prior Publication Data
US 2016/0293132 A1    Oct. 6, 2016

(30) Foreign Application Priority Data

Apr. 21, 2014   (CN) .......................... 2014 1 0160613

(51) Int. Cl.
*G06F 3/14*        (2006.01)
*G09G 5/00*        (2006.01)
*H04N 7/01*        (2006.01)

(52) U.S. Cl.
CPC ............... *G09G 5/005* (2013.01); *G06F 3/14* (2013.01); *G09G 5/00* (2013.01); *H04N 7/0127* (2013.01);
(Continued)

(58) Field of Classification Search
CPC ....... G09G 2330/021; G09G 2320/043; G09G 2320/041; G09G 3/20; G09G 3/3233; G09G 5/005; G06F 3/14
See application file for complete search history.

(56) References Cited

U.S. PATENT DOCUMENTS 7,012,600 B2 *  3/2006  Zehner .................... G02F 1/167
                                                  345/204
7,119,772 B2 * 10/2006  Amundson ............. G02F 1/167
                                                  345/210
(Continued)

FOREIGN PATENT DOCUMENTS

CN          101115202 A     1/2008
CN          101221741 A     7/2008
(Continued)

OTHER PUBLICATIONS

Written Opinion of the International Searching Authority dated Jan. 26, 2015 corresponding to International application No. PCT/CN2014/085289.
(Continued)

*Primary Examiner* — Ricardo L Osorio
(74) *Attorney, Agent, or Firm* — Nath, Goldberg & Meyer; Joshua B. Goldberg

(57) ABSTRACT

The present invention discloses a display, a display system, and a data processing method. The display comprises a data processing unit and a display device, the display device having a set refresh frequency; the data processing unit being configured to convert original data signals into display
(Continued)

data signals and output the display data signals to the display device, the frame rate of the original data signals being an original frequency, and the frame rate of the display data signals being the refresh frequency; and the display device being configured to display the display data signals. According to the technical solutions of the present invention, the processing of converting the original data signals into the display data signals is performed by the data processing unit of the display, thereby reducing the load of the image processing unit, and in turn improving the performance of the display system.

12 Claims, 2 Drawing Sheets

(52) U.S. Cl.
CPC ............... *G09G 2310/0267* (2013.01); *G09G 2310/0291* (2013.01); *G09G 2310/08* (2013.01)

(56) References Cited

U.S. PATENT DOCUMENTS

| | | | |
|---|---|---|---|
| 7,327,329 B2* | 2/2008 | Kobayashi | G09G 3/3648 345/3.2 |
| 7,692,642 B2* | 4/2010 | Wyatt | G09G 5/006 345/211 |
| 7,893,951 B2* | 2/2011 | Narui | G09G 3/2092 345/204 |
| 8,375,301 B2* | 2/2013 | Nuyttens | H04N 9/12 715/717 |
| 9,412,314 B2* | 8/2016 | Amundson | G09G 3/344 |
| 2007/0229418 A1 | 10/2007 | Yun et al. | |
| 2014/0028722 A1 | 1/2014 | Yun | |

FOREIGN PATENT DOCUMENTS

| | | |
|---|---|---|
| CN | 101320544 A | 12/2008 |
| CN | 101996590 A | 3/2011 |
| CN | 102968972 A | 3/2013 |
| CN | 103956149 A | 7/2014 |
| WO | 2013175735 A1 | 11/2013 |

OTHER PUBLICATIONS

International Search Report dated Aug. 27, 2014 corresponding to International application No. PCT/CN2014/085289.

1st Office Action issued in Chinese application No. 201410160613.1 dated Aug. 20, 2015.

* cited by examiner

DISPLAY, DISPLAY SYSTEM AND DATA PROCESSING METHOD

This is a National Phase Application filed under 35 U.S.C. 371 as a national stage of PCT/CN2014/085289, filed Aug. 27, 2014, an application claiming the benefit of Chinese Application No. 201410160613.1, filed Apr. 21, 2014, the content of each of which is hereby incorporated by reference in its entirety.

FIELD OF THE INVENTION

The present invention relates to the field of display technology, and in particular to a display, a display system, and a data processing method.

BACKGROUND OF THE INVENTION

A frame rate of video is a magnitude for measuring the number of display frames, with the measuring unit being frames per second (FPS) or hertz (Hz). Known frame rates of video signals are as shown in Table 1 below:

TABLE 1

|  | Television | |
| --- | --- | --- |
| Movie | PAL | NTSC |
| 23.976 fps | 25 fps | 29.97 fps |

In Table 1, the frame rate of movie video signals is 23.976 fps, and television video signals may include, for example, phase alternating line (PAL) standard video signals and national television standards committee (NTSC) standard video signals, wherein the frame rate of the PAL standard video signals is 25 fps, and the frame rate of the NTSC standard video signals is 29.97 fps.

At the same time, different types of displays have different refresh frequencies, and a refresh frequency refers to the refresh rate of a screen. The lower the refresh frequency is, the more serious the image flicks, pauses and dithers, and the more easily eyes fatigue. Currently, refresh frequencies of different types of displays are as shown in Table 2 below:

TABLE 2

| CRT display | Liquid crystal display | 3D display |
| --- | --- | --- |
| 60 Hz-85 Hz | 60 Hz-75 Hz | 120 Hz |

In Table 2, the displays may include: a cathode ray tube (CRT) display, a liquid crystal display and a 3D display, wherein the refresh frequency of the CRT display is 60 Hz-85 Hz, the refresh frequency of the liquid crystal display is 60 Hz-75 Hz, and the refresh frequency of the 3D display is 120 Hz.

The display receives video signals transmitted by an image processing unit and displays the received video signals. Table 1 shows the frame rate of the video signals received by the image processing unit, and Table 2 shows the refresh frequency of the display screen. It can be seen from Table 1 and Table 2 that, the frame rate of the video signals received by the image processing unit is significantly lower than the refresh frequency of the display screen, and therefore, in the prior art, before sending the video signals to the display, the image processing unit is required to convert the video signals into video signals of which the frame rate is consistent with the refresh frequency of the display screen. Taking video signals with a frame rate of 30 Hz, and a display with a refresh frequency of 60 Hz and a resolution of 1366*768 as an example, after receiving the video signals of 30 Hz, the image processing unit converts the video signals of 30 Hz into video signals of 60 Hz, which can be displayed by the display, and outputs video signals of 60 Hz to the display and therefore, the pixel data volume transmitted to the display by the image processing unit is 1366*768*60=62,945,280 per second.

In summary, in the prior art, due to a larger amount of data transmission and a larger amount of data processing of the image processing unit, the load of the image processing unit is greatly increased, so that the image processing unit is likely to become a performance bottleneck of a display system.

SUMMARY OF THE INVENTION

An object of the present invention is to provide a display, a display system, and a data processing method, so as to reduce the load of an image processing unit, thereby enhancing the performance of the display system.

To achieve the above object, the present invention provides a display, including: a data processing unit and a display device which has a set refresh frequency;

the data processing unit is configured to convert original data signals into display data signals and output the display data signals to the display device, a frame rate of the original data signals being an original frequency, and a frame rate of the display data signals being the refresh frequency; and the display device is configured to display the display data signals.

Optionally, the data processing unit includes a transmission module, a storage module, and a data processing module, the transmission module being connected with the storage module and the data processing module respectively, the storage module being connected with the data processing module, and the data processing module being further connected with the display device;

the transmission module is configured to receive any one frame of data in the original data signals and output the frame of data to the storage module and the data processing module respectively;

the storage module is configured to store the frame of data in the original data signals and output the frame of data to the data processing module; and the data processing module is configured to generate a set number of copies of the frame of data based on the frame of data in the original data signals output by the storage module, and output the frame of data in the original data signals output by the transmission module and the generated set number of copies of the frame of data to the display device as the display data signals.

Optionally, the set number is one or more.

Optionally, the transmission module is a line buffer, and the storage module is a read-only memory.

Optionally, the display further includes a timing controller, and the data processing unit is integrated with the timing controller; and the timing controller is configured to control a display process of the display device.

Optionally, the display device includes a gate driver, a source driver, and a display panel, wherein, the display panel is connected with the gate driver and the source driver respectively, and the source driver is connected with the data processing unit;

the gate driver is configured to output gate scanning signals to the display panel;

the source driver is configured to receive the display data signals output by the data processing unit and output the display data signals to the display panel; and the display panel is configured to display the display data signals under control of the gate scanning signals.

To achieve the above object, the present invention further provides a display system, including: an image processing unit and the above display; and the image processing unit is configured to output the original data signals to the display.

To achieve the above object, the present invention further provides a data processing method, including the following steps:

a step of converting original data signals into display data signals and outputting the display data signals to a display device by a data processing unit, wherein, the display device has a set refresh frequency, a frame rate of the original data signals is an original frequency, and a frame rate of the display data signals is the refresh frequency; and a step of displaying the display data signals by the display device.

Optionally, the data processing unit includes a transmission module, a storage module, and a data processing module, the transmission module being connected with the storage module and the data processing module respectively, the storage module being connected with the data processing module, and the data processing module being further connected with the display device. The step of converting original data signals into display data signals and outputting the display data signals to a display device by a data processing unit includes:

receiving any one frame of data in the original data signals and outputting the frame of data to the storage module and the data processing module respectively by the transmission module;

storing the frame of data in the original data signals and outputting the frame of data to the data processing module by the storage module; and generating a set number of copies of the frame of data based on the frame of data in the original data signals output by the storage module, and outputting the frame of data in the original data signals output by the transmission module and the generated set number of copies of the frame of data to the display device as the display data signals by the data processing module.

Optionally, the set number is one or more.

The present invention has the following beneficial effects:

in the display, the display system and the data processing method according to the present invention, the data processing unit of the display may convert the original data signals into the display data signals, the frame rate of the original data signals being the original frequency, the frame rate of the display data signals being the refresh frequency of the display device. Thus, the image processing unit is only required to directly transmit the original data signals to the data processing unit of the display, which greatly reduces the amount of data transmission and the amount of data processing of the image processing unit, thereby reducing the load of the image processing unit, and in turn improving the performance of the display system.

DETAILED DESCRIPTION OF THE EMBODIMENTS

To make a person skilled in the art better understand the technical solution of the present invention, the embodiments according to the present invention are further described below in details in conjunction with the accompanying drawings.

Figure 1:
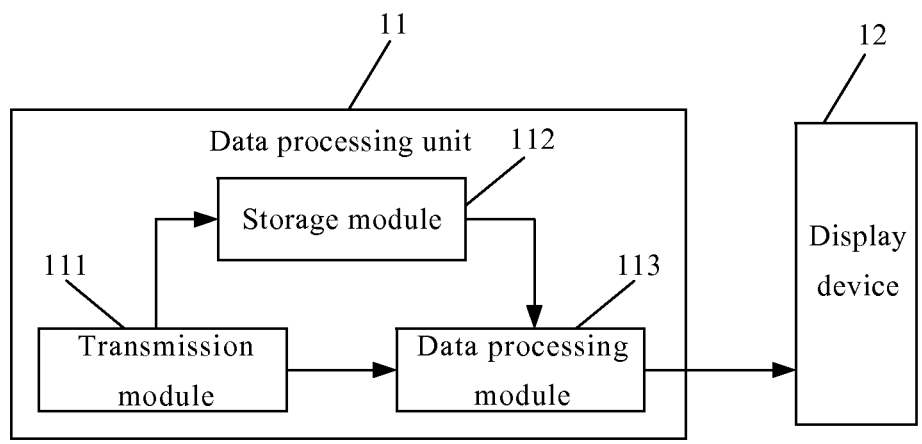
FIG. 1 is a schematic view of a structure of a display according to a first embodiment of the present invention.

FIG. 1 is a schematic view of a structure of a display according to a first embodiment of the present invention. As shown in FIG. 1, the display includes a data processing unit 11 and a display device 12 which has a set refresh frequency. The data processing unit 11 is configured to convert original data signals into display data signals, and output the display data signals to the display device 12; the frame rate of the original data signals is an original frequency, and the frame rate of the display data signals is the refresh frequency, wherein the original data signals are signals which are output by an image processing unit and may be displayed directly by the display device 12 at the original frequency. The display device 12 is configured to display the display data signals.

The original data signals and the display data signals may respectively include a plurality of frames of data. For example: if the original frequency is 30 Hz, then the original data signals may include 30 frames of data per second; and if the refresh frequency is 60 Hz, then the display data signals may be displayed with 60 frames of data per second. Since the display device 12 has a set refresh frequency, for example, the refresh frequency is 60 Hz, then in order to display the original data signals on the display device 12, the data processing unit 11 will convert the original data signals with the frame rate of the original frequency to the display data signals with the frame rate of the refresh frequency. For example, the data processing unit 11 converts the original data signals with a frame rate of 30 Hz to the display data signals with a frame rate of 60 Hz.

In this embodiment, the data processing unit 11 includes a transmission module 111, a storage module 112, and a data processing module 113, the transmission module 111 being connected with the storage module 112 and the data processing module 113 respectively, the storage module 112 being connected with the data processing module 113, and the data processing module 113 being further connected with the display device 12. The transmission module 111 is configured to receive any frame of data in the original data signals from the image processing unit and output the frame of data in the original data signals to the storage module 112 and the data processing module 113 respectively. The storage module 112 is configured to store the frame of data in the original data signals and output the same to the data processing module 113. The data processing module 113 is configured to generate a set number of copies of the frame of data based on the frame of data in original data signals output by the storage module 112, and output the frame of data in the original data signals output by the transmission module 111 and the generated set number of copies of the frame of data to the display device 12 as the display data signals.

Preferably, the set number is one or more, wherein the data processing module 113 may generate the set number of copies of the frame of data based on the frame of data in the original data signals output by the storage module 112 by means of a preset data processing rule. The data processing rule is to interpolate the set number of copies of the frame of data after the frame of data in the original data signals output by the transmission module 111. Specifically, if the data processing rule is to interpolate one said frame of data after the frame of data in the original data signals output by the transmission module 111, then the data processing module 113 generates one said frame of data based on the frame of data in the original data signals output by the storage module 112; and if the data processing rule is to interpolate multiple copies of the frame of data after the frame of data in the original data signals output by the transmission module 111, then the data processing module 113 generates multiple copies of the frame of data based on the frame of data in the original data signals output by the storage module 112. When the set number is multiple, the specific method of the data processing module 113 generating a set number of copies of the frame of data may include: replicating a set number of copies of the frame of data by the data processing module 113.

Figure 2:
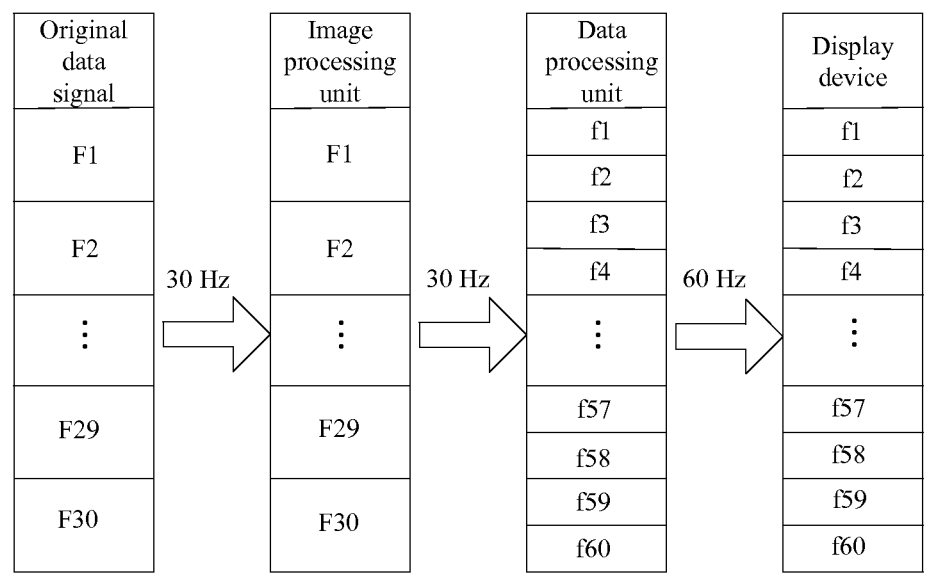
FIG. 2 is a schematic view of data transmission according to the first embodiment of the present invention.

The operation process of the data processing unit 11 will be described below in detail by means of a specific example, and specifically, the description is made by taking the original frequency of 30 Hz and the refresh frequency of 60 Hz as an example. FIG. 2 is a schematic view of data transmission of the first embodiment. As shown in FIGS. 1 and 2, in the case of the original data signals with a display frame rate of 30 Hz, the image processing unit will first receive the original data signals with a frame rate of 30 Hz. The original data signals may include a plurality of frames of data, and it is assumed that each frame of data in the original data signals with a frame rate of 30 Hz is defined as: F1, F2, . . . , F29, and F30; and the display data signals may include a plurality of frames of data, and it is assumed that each frame of data in the display data signals with a frame rate of 60 Hz is defined as: f1, f2, f3, f4, . . . , f57, f58, f59, and f60. According to the present invention, when the image processing unit receives the original data signals with a frame rate of 30 Hz, the image processing unit is not allowed to perform frame rate conversion processing (e.g., interpolation processing) on each frame of data in the original data signals by a program (e.g., a software, a firmware, an application, codes, instructions, etc.), but to directly output the original data signals with a frame rate of 30 Hz to the transmission module 111. Specifically, the image processing unit sequentially outputs frames of data F1, F2, . . . , F29, and F30 in the original data signals to the transmission module 111. After the transmission module 111 receives F1, F1 is output to the storage module 112 and the data processing module 113 respectively. The storage module 112 stores F1 and outputs F1 to the data processing module 113. According to the preset processing rules (e.g., the set number is one), the data processing module 113 generates one copy of F1 according to F1 output by the storage module 112, and at this time, f1 in the display data signals may be F1 output by the transmission module 111, and f2 in the display data signals may be the copy of F1 generated by the data processing module 113. Afterwards, the data processing module 113 sequentially outputs f1 and f2 in the display data signals to the display device 12. Similarly, after the transmission module 111 receives F2, F2 is output to the storage module 112 and the data processing module 113 respectively. The storage module 112 stores F2 and outputs F2 to the data processing module 113. The data processing module 113 generates one copy of F2 according to F2 output by the storage module 112, and at this time, f3 in the display data signals may be F2 output by the transmission module 111, and f4 in the display data signals may be the copy of F2 generated by the data processing module 113. The data processing module 113 sequentially outputs f3 and f4 in the display data signals to the display device 12. The data processing module 113 sequentially processes F3 to F30 in accordance with the above data processing modes of F1 and F2, to derive f5 to f60, so that the data processing unit 11 converts the original data signals with a frame rate of 30 Hz into the display data signals with a frame rate of 60 Hz. In the above process, because the image processing unit outputs the original data signals directly to the display data processing unit 11 of the display after receiving the original data signals, the pixel data volume transmitted to the data processing unit 11 of the display by the image processing unit is 1366*768*30=31,472,640 per second. Compared with the prior art, the pixel data volume transmitted to the display by the image processing unit per second is reduced by half, thereby reducing the amount of data transmission and the amount of data processing of the image processing unit.

In this embodiment, the original data signals may be video signals or operation instruction signals. For example, the operation instruction signals may be instruction signals to open WORD documents. In practical applications, the original data signals may also be other types of data signals, which will not be enumerated here.

Preferably, the transmission module 111 is a line buffer, and the storage module 112 is a read-only memory (ROM).

In the embodiment, the data processing unit 11 is included in the display. However, the data processing unit 11 may be separately provided.

According to a second embodiment of the present invention, the display may further include a timing controller. In this embodiment, preferably, the data processing unit 11 is integrated with the timing controller, for example, the data processing unit 11 is integrated in the timing controller. The timing controller may be configured to control the display process of the display device. In this embodiment, the timing controller can be a conventional timing controller, and detailed description of the timing controller is omitted here.

Figure 3:
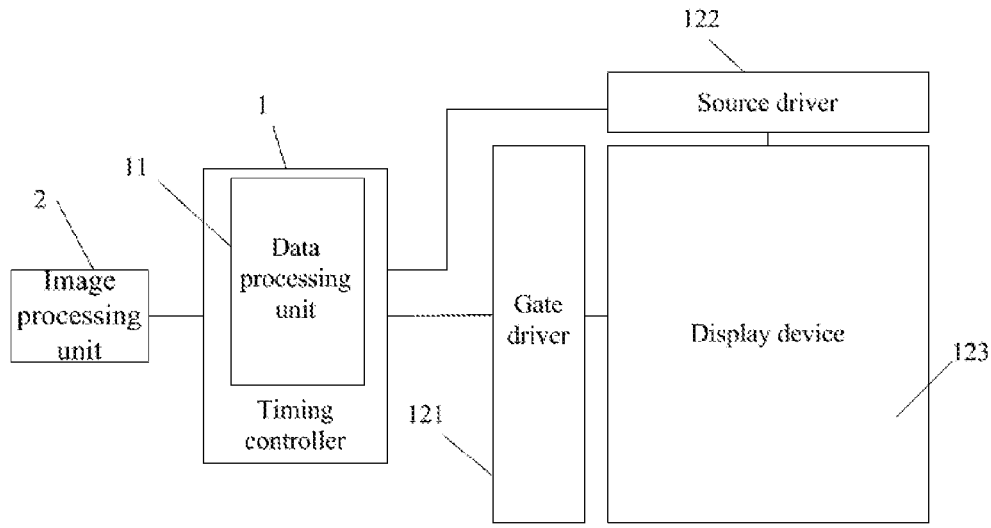
FIG. 3 is a schematic view of an application of a display according to a second embodiment of the present invention.

FIG. 3 is a schematic view of an application of a display according to the second embodiment of the present invention. As shown in FIG. 3, the display includes a timing controller 1 and a display device, wherein the data processing unit 11 is integrated with the timing controller 1, and the timing control 1 is connected with the image processing unit 2 and the display device respectively. As shown in FIG. 3, the display device may include a gate driver 121, a source driver 122, and a display panel 123, wherein the display panel 123 is connected with the gate driver 121 and the source driver 122 respectively, and the source driver 122 is connected with the data processing unit 11. The gate driver 121 is configured to output gate scanning signals to the display panel 123; the source driver 122 is configured to receive the display data signals output by the data processing unit 11 and output the same to the display panel 123; and the display panel 123 is configured to display the display data signals under the control of the gate scanning signals.

The display according to the second embodiment of the present invention includes a data processing unit and a display device. The data processing unit may convert the original data signals into the display data signals, the frame rate of the original data signals is the original frequency, and the frame rate of the display data signals is the refresh frequency of the display device. In this embodiment, the image processing unit is only required to directly transmit the original data signals to the data processing unit of the display, which greatly reduces the amount of data transmission and the amount of data processing of the image processing unit, thereby reducing the load of the image processing unit, and in turn improving the performance of a display system. Meanwhile, in the embodiment, the original data signals are processed (i.e., the original data signals are converted into the display data signals) by the data processing unit disposed in the display, thereby enhancing the data processing capability of the display.

According to a third embodiment of the present invention, a display system is provided. The display system includes an image processing unit and a display. The image processing unit is configured to output the original data signals to the display, wherein the display may be the display provided by the above-described embodiments, and the detailed description thereof is omitted here.

In the display system according to the third embodiment of the present invention, the display includes a data processing unit and a display device. The data processing unit may convert the original data signals into the display data signals, the frame rate of the original data signals is the original frequency, and the frame rate of the display data signals is the refresh frequency of the display device. In the embodiment, the image processing unit only required to directly transmit the original data signals to the display data processing unit of the display, which greatly reduces the amount of data transmission and the amount of data processing of the image processing unit, thereby reducing the load of the image processing unit, and in turn improving the performance of the display system. Meanwhile, in the embodiment, the original data signals are processed (i.e., the original data signals are converted into the display data signals) by the data processing unit disposed in the display, thereby enhancing the data processing capability of the display.

Figure 4:
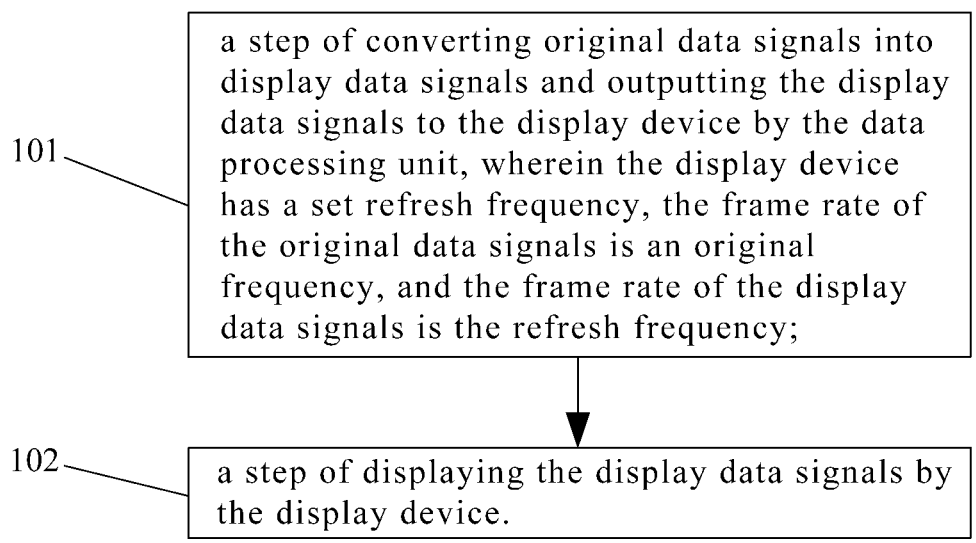
FIG. 4 is a flow chart of a data processing method according to a fourth embodiment of the present invention.

FIG. 4 is a flow chart of a data processing method according to a fourth embodiment of the present invention. As shown in FIG. 4, the method includes the following steps:

step 101: converting the original data signals into the display data signals and outputting the display data signals to the display device by the data processing unit, wherein the display device has a set refresh frequency, the frame rate of the original data signals is an original frequency, and the frame rate of the display data signal is the refresh frequency; and step 102: displaying the display data signals by the display device.

In this embodiment, with reference to FIG. 1, the data processing unit includes a transmission module, a storage module, and a data processing module, the transmission module being connected with the storage module and the data processing module respectively, the storage module being connected with the data processing module, and the data processing module being further connected with the display device.

Therefore, Step 101 may include the following steps:

(1) receiving any one frame of data in the original data signals and outputting the frame of data to the storage module and the data processing module respectively by the transmission module;

(2) storing the frame of data in the original data signals and outputting the frame of data to the data processing module by the storage module; and (3) generating a set number of copies of the frame of data based on the frame of data in original data signals output by the storage module, and outputting the frame of data in the original data signals output by the transmission module and the generated set number of copies of the frame of data to the display device as the display data signals by the data processing module, wherein the set number is one or more.

The data processing method provided by the present embodiment can be carried out by the display provided by the above embodiments, and the detailed description of the display may be referred to the above embodiments, which will not be repeated here.

In the data processing method according to the fourth embodiment of the present invention, the data processing unit of the display may convert the original data signals into the display data signals, the frame rate of the original data signals being the original frequency, and the frame rate of the display data signals being the refresh frequency of the display device. According to the data processing method of the present invention, the image processing unit is only required to directly transmit the original data signals to the data processing unit of the display, which greatly reduces the amount of data transmission and the amount of data processing of the image processing unit, thereby reducing the load of the image processing unit, and in turn improving the performance of the display system. In the embodiment, the original data signals are processed (i.e., the original data signals are converted into the display data signals) by the data processing unit disposed in the display, thereby enhancing the data processing capability of the display.

It should be understood that the above embodiments are only exemplary embodiments for explaining the principle of the present invention, and the present invention is not limited thereto. For a person having ordinary skill in the art, various variations and improvements can be made without departing from the spirit and essence of the present invention, and these variations and improvements shall fall within the protection scope of the present invention.

The invention claimed is:

1. A display, comprising a data processing unit and a display device, the display device having a set refresh frequency, wherein the data processing unit is configured to convert original data signals into display data signals and output the display data signals to the display device, a frame rate of the original data signals being an original frequency, and a frame rate of the display data signals being the refresh frequency;

the display device is configured to display the display data signals;

the data processing unit comprises a transmission module, a storage module, and a data processing module, the transmission module being connected with the storage module and the data processing module respectively, the storage module being connected with the data processing module, and the data processing module being further connected with the display device;

the transmission module is configured to receive any one frame of data in the original data signals and output the frame of data to the storage module and the data processing module respectively;

the storage module is configured to store the frame of data in the original data signals and output the frame of data to the data processing module; and the data processing module is configured to generate a set number of copies of the frame of data based on the frame of data in original data signals output by the storage module, and output the frame of data in the original data signals output by the transmission module and the generated set number of copies of the frame of data to the display device as the display data signals.

2. The display according to claim 1, wherein the set number is one or more.

3. The display according to claim 1, wherein, the transmission module is a line buffer, and the storage module is a read-only memory.

4. The display according to claim 1, further comprising: a timing controller, and the data processing unit being integrated with the timing controller; and the timing controller is configured to control a display process of the display device.

5. The display according to claim 1, wherein, the display device comprises a gate driver, a source driver, and a display panel, the display panel being connected with the gate driver and the source driver respectively, and the source driver being connected with the data processing unit;

the gate driver is configured to output gate scanning signals to the display panel;

the source driver is configured to receive the display data signals output by the data processing unit and output the display data signals to the display panel; and the display panel is configured to display the display data signals under control of the gate scanning signals.

6. A display system, comprising: an image processing unit and a display, wherein the display comprises a data processing unit and a display device, the display device having a set refresh frequency, wherein the data processing unit is configured to convert original data signals into display data signals and output the display data signals to the display device, a frame rate of the original data signals being an original frequency, and a frame rate of the display data signals being the refresh frequency; and the display device is configured to display the display data signals;

the image processing unit is configured to output the original data signals to the display;

the data processing unit comprises a transmission module, a storage module, and a data processing module, the transmission module being connected with the storage module and the data processing module respectively, the storage module being connected with the data processing module, and the data processing module being further connected with the display device;

the transmission module is configured to receive any one frame of data in the original data signals and output the frame of data to the storage module and the data processing module respectively;

the storage module is configured to store the frame of data in the original data signals and output the frame of data to the data processing module; and the data processing module is configured to generate a set number of copies of the frame of data based on the frame of data in original data signals output by the storage module, and output the frame of data in the original data signals output by the transmission module and the generated set number of copies of the frame of data to the display device as the display data signals.

7. The display system according to claim 6, wherein the set number is one or more.

8. The display system according to claim 6, wherein, the transmission module is a line buffer, and the storage module is a read-only memory.

9. The display system according to claim 6, wherein the display further comprises a timing controller, and the data processing unit being integrated with the timing controller; and the timing controller is configured to control a display process of the display device.

10. The display system according to claim 6, wherein, the display device comprises a gate driver, a source driver, and a display panel, the display panel being connected with the gate driver and the source driver respectively, and the source driver being connected with the data processing unit;

the gate driver is configured to output gate scanning signals to the display panel;

the source driver is configured to receive the display data signals output by the data processing unit and output the display data signals to the display panel; and the display panel is configured to display the display data signals under control of the gate scanning signals.

11. A data processing method, comprising the following steps:

a step of converting original data signals into display data signals and outputting the display data signals to a display device by a data processing unit, wherein, the display device has a set refresh frequency, a frame rate of the original data signals is an original frequency, and a frame rate of the display data signals is the refresh frequency;

a step of displaying the display data signals by the display device;

the data processing unit comprises a transmission module, a storage module, and a data processing module, the transmission module being connected with the storage module and the data processing module respectively, the storage module being connected with the data processing module, and the data processing module being further connected with the display device; the step of converting original data signals into display data signals and outputting the display data signals to a display device by the data processing unit comprises:

receiving any one frame of data in the original data signals and outputting the frame of data to the storage module and the data processing module respectively by the transmission module;

storing the frame of data in the original data signals and outputting the frame of data to the data processing module by the storage module; and generating a set number of copies of the frame of data based on the frame of data in the original data signals output by the storage module, and outputting the frame of data in the original data signals output by the transmission module and the generated set number of copies of the frame of data to the display device as the display data signals by the data processing module.

12. The data processing method according to claim 11, wherein the set number is one or more.

* * * * *